US008165801B1

(12) United States Patent
Jintaseranee et al.

(10) Patent No.: US 8,165,801 B1
(45) Date of Patent: Apr. 24, 2012

(54) NAVIGATION SERVICE OVER WIRELESS VOICE NETWORKS

(75) Inventors: Kosol Jintaseranee, Sunnyvale, CA (US); Soshant Bali, Menlo Park, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 424 days.

(21) Appl. No.: 12/547,173

(22) Filed: Aug. 25, 2009

(51) Int. Cl.
*G08G 1/123* (2006.01)

(52) U.S. Cl. ........ 701/408; 701/117; 701/119; 701/400; 701/419; 701/420; 701/421; 340/995.19; 340/461

(58) Field of Classification Search .................. 701/201, 701/202, 204, 208, 117, 119, 209, 211, 213; 340/461, 995.19; 455/433; 370/458
See application file for complete search history.

(56) References Cited

U.S. PATENT DOCUMENTS

| 6,292,743 | B1 * | 9/2001 | Pu et al. ........................ 701/202 |
| 6,650,896 | B1 | 11/2003 | Haymes et al. |
| 6,664,924 | B2 * | 12/2003 | Knockeart et al. ....... 342/357.31 |
| 6,678,614 | B2 * | 1/2004 | McCarthy et al. ............ 701/213 |
| 7,158,790 | B1 | 1/2007 | Elliott |
| 7,158,881 | B2 * | 1/2007 | McCarthy et al. ............ 701/213 |
| 7,215,969 | B2 | 5/2007 | Benco et al. |
| 7,328,103 | B2 | 2/2008 | McCarthy et al. |
| 7,738,485 | B1 * | 6/2010 | Machiraju et al. ............. 370/458 |
| 7,796,551 | B1 * | 9/2010 | Machiraju et al. ............. 370/330 |
| 7,865,297 | B2 * | 1/2011 | Ruckart ........................ 701/201 |
| 7,889,101 | B2 * | 2/2011 | Yokota ..................... 340/995.19 |
| 7,999,703 | B2 * | 8/2011 | Ohki ........................ 340/995.19 |
| 8,014,942 | B2 * | 9/2011 | Moinzadeh et al. .......... 701/201 |
| 8,032,151 | B2 * | 10/2011 | Paulson et al. ............. 455/456.1 |
| 8,059,616 | B1 * | 11/2011 | Marchiraju et al. .......... 370/335 |
| 8,060,086 | B1 * | 11/2011 | Jintaseranee et al. ......... 455/433 |
| 2001/0056325 | A1 | 12/2001 | Pu et al. |
| 2003/0018428 | A1 | 1/2003 | Knockeart et al. |
| 2008/0109165 | A1 | 5/2008 | McCarthy et al. |
| 2008/0132249 | A1 | 6/2008 | Hamilton |
| 2009/0157615 | A1 * | 6/2009 | Ross et al. ........................ 707/3 |
| 2009/0248178 | A1 * | 10/2009 | Paulson et al. .................. 700/66 |
| 2010/0127847 | A1 * | 5/2010 | Evans et al. .................... 340/461 |
| 2010/0131191 | A1 * | 5/2010 | Ohki ............................. 701/201 |
| 2010/0184453 | A1 * | 7/2010 | Ohki .......................... 455/456.3 |
| 2011/0244888 | A1 * | 10/2011 | Ohki .......................... 455/456.2 |

OTHER PUBLICATIONS

Gina Trapani, "Geek to Live: Use your cell phone as a modem," Lifehacker.com, May 19, 2006, 4 pages, http://lifehacker.com/software/cell-phones/geek-to-live-use-your-cell-phone-as-a-modem-175048.php.

* cited by examiner

*Primary Examiner* — Thomas Black
*Assistant Examiner* — Wae Louie

(57) ABSTRACT

A wireless communication device transmits first text messaging to a navigation computer system. The first text messaging indicates an identity, initial location, and destination location for the wireless communication device. The navigation computer system processes the first text messaging to determine navigation instructions from the initial location to the destination location and to initiate a voice call to the wireless communication device. The wireless communication device processes a caller number for the voice call to answer the call in speaker-phone mode and to transfer second text messaging to the navigation computer system. The second text messaging indicates current locations of the wireless communication device. The navigation computer system processes the second text messaging to transfer the navigation instructions over the voice call based on the current locations of the wireless communication device. The wireless communication device receives the navigation instructions over the voice call and audibly presents the navigation instructions.

20 Claims, 7 Drawing Sheets

NAVIGATION SERVICE OVER WIRELESS VOICE NETWORKS

TECHNICAL BACKGROUND

A wireless communication device can implement a navigation session over a wireless data network. The wireless communication device receives a destination location from the user and transfers its current location and the destination location to a navigation computer system over the wireless data network. The navigation computer system processes the current location and the destination location to determine navigation instructions from the current location and the destination location. The wireless communication device continuously determines its current location through Global Positioning System (GPS) signal processing and transfers its current location to the navigation computer system over the wireless data network. The navigation computer system processes the current locations to transfer map data and audio files to the wireless communication device over the wireless data network. The wireless communication device displays the map data and plays the audio files to provide turn-by-turn directions to the destination location.

Overview

A wireless communication device transmits first text messaging to a navigation computer system. The first text messaging indicates an identity, initial location, and destination location for the wireless communication device. The navigation computer system processes the first text messaging to determine navigation instructions from the initial location to the destination location and to initiate a voice call to the wireless communication device. The wireless communication device processes a caller number for the voice call to answer the call in speaker-phone mode and to transfer second text messaging to the navigation computer system. The second text messaging indicates current locations of the wireless communication device. The navigation computer system processes the second text messaging to transfer the navigation instructions over the voice call based on the current locations of the wireless communication device. The wireless communication device receives the navigation instructions over the voice call and audibly presents the navigation instructions.

DETAILED DESCRIPTION

Figure 1:
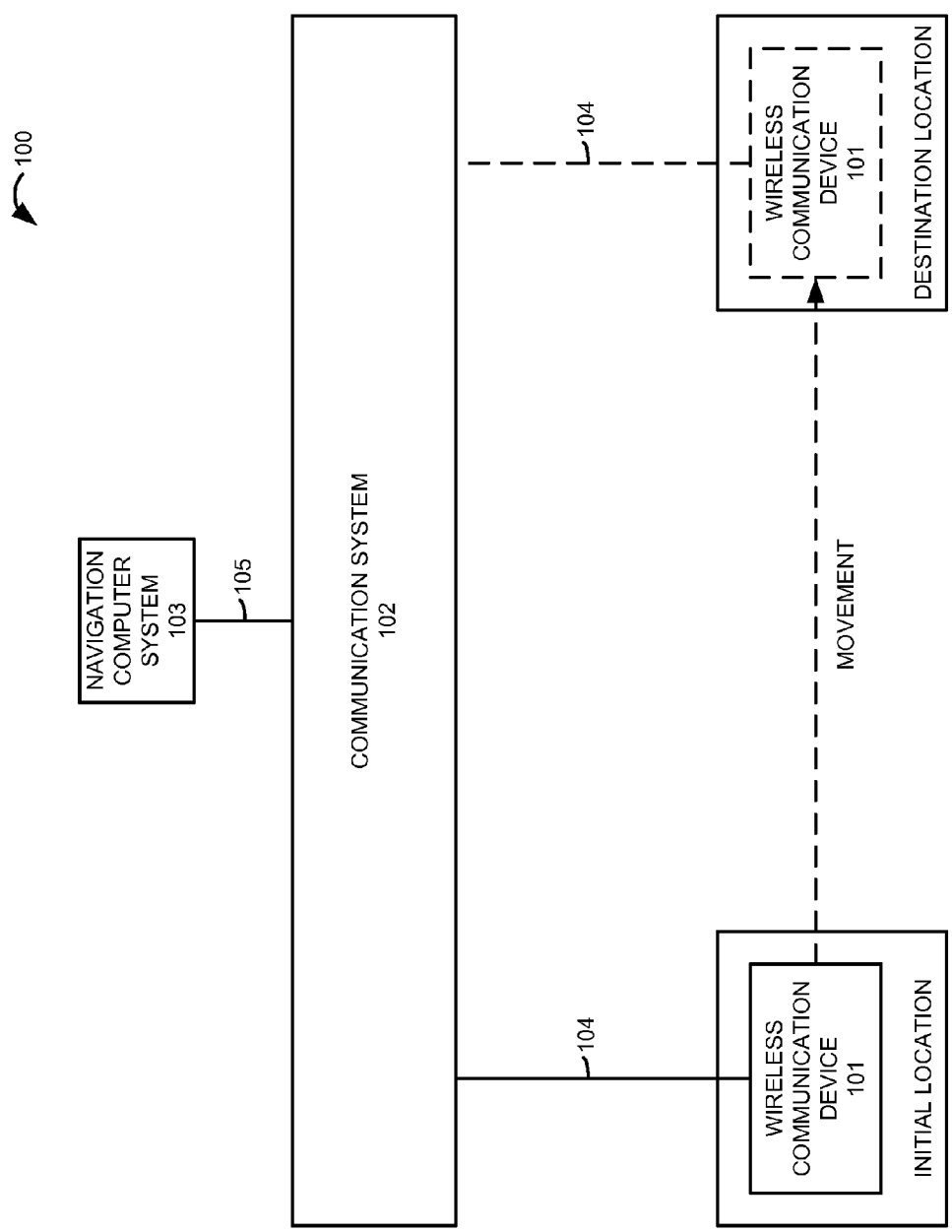
FIG. 1 illustrates a navigation system.

FIG. 1 illustrates navigation system 100. Navigation system 100 includes wireless communication device 101, communication system 102, and navigation computer system 103. Wireless communication device 101 and communication system 102 communicate over wireless voice link 104. Communication system 102 and navigation computer system 103 communicate over communication link 105. Thus, wireless communication device 101 and navigation computer system 103 communicate over communication system 102 and links 104-105. The movement of wireless communication device 101 from an initial location to a destination location is illustrated on FIG. 1 by dashed lines.

Figure 2:
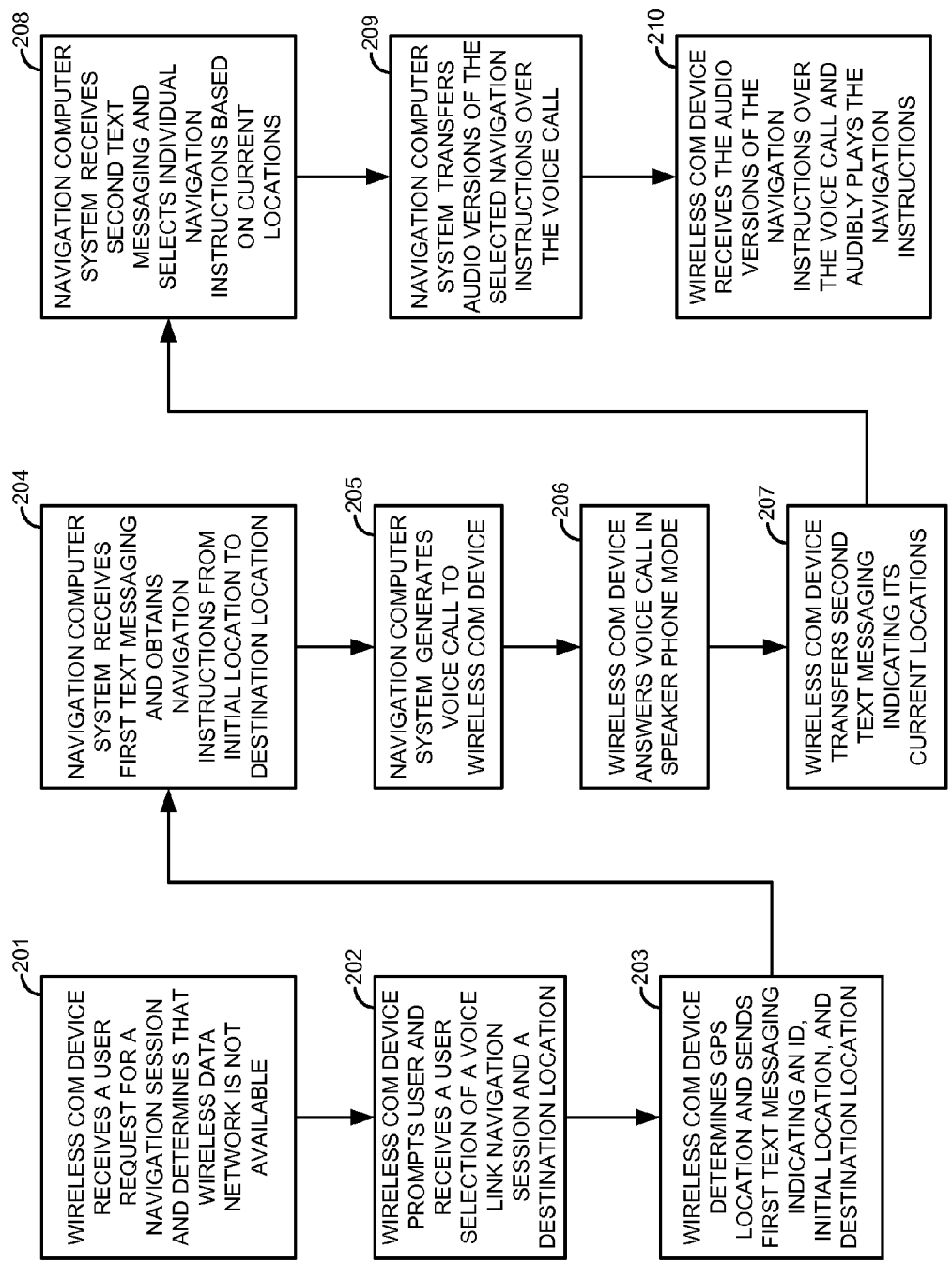
FIG. 2 illustrates the operation of the navigation system.

FIG. 2 illustrates the operation of navigation system 100. Wireless communication device 101 receives a user request for a navigation session and determines that a wireless data network for the navigation session is not available (201). For example, the user could be in an area without wireless data service, the user may have exhausted their allotted wireless data service, or the data network could be overloaded or impaired. In some scenarios, wireless communication device 101 may have an existing navigation session in progress over a wireless data network, and device 101 leaves the wireless data network service area.

In response to the user navigation request and the lack of a wireless data network, wireless communication device 101 prompts the user to select a voice link navigation session (202). The user selects voice link navigation and identifies a destination location (202). Wireless communication device 101 begins to periodically determine its current GPS location, unless this GPS feature is already active (203).

In response to the user selection of voice link navigation, wireless communication device 101 transfers first text messaging to navigation computer system 103 (203). The first text messaging indicates an identifier, an initial GPS location, and the destination location for wireless communication device 101. The identifier could be a telephone number, and the destination location could be a name, intersection, or address—although other suitable data could be used. The first text messaging could be a single message or multiple messages.

Navigation computer system 103 processes the first text messaging to determine navigation instructions from the initial location to the destination location (204). The navigation instructions could be turn-by-turn driving instructions or some other form of navigation information. Navigation computer system 103 may determine the instructions internally or may query an external system to determine the instructions. Navigation computer system 103 generates a voice call to wireless communication device 101 (205).

Upon receiving the voice call request, wireless communication device 101 processes the calling telephone number of navigation computer system 103, and in response, automatically answers the voice call in speaker-phone mode (206). Although not shown, wireless communication device 101 typically transfers a tone to navigation computer system 103 over the voice call indicating that the call is answered in speaker phone mode, and navigation computer system 103 returns an audio greeting to the user.

Also in response to processing the calling telephone number of navigation computer system 103, wireless communication device 101 automatically transfers second text messaging to navigation computer system 103 indicating its identifier and the current GPS locations for wireless communication device 101 (207). The second text messaging comprises a periodic series of text messages, where each message indicates the current GPS location of wireless communication device 101. The periodic frequency of the text messages could be one message every second, every five seconds, or some other suitable time frame.

Navigation computer system 103 receives and processes the second text messaging to select appropriate ones of the navigation instructions based on the current GPS locations (208). Navigation computer system 103 then transfers audio versions of the selected navigation instructions to wireless communication device 101 over the voice call (209). For example, navigation computer system 103 could speak turn-by-turn driving instructions over the voice call, where each instruction corresponds to the current GPS location of wireless communication device 101. Wireless communication device 101 receives the audio versions of the navigations instructions over the voice call and audibly plays the received navigations instructions to the user (210).

Note that there may be a significant time lag between the transfer and receipt of the second text messaging. To address this latency situation, wireless communication device 101 could time stamp the transfer time of each text message. Navigation computer system 103 could then process the time stamps to determine the text messaging latency. Navigation computer system 103 would also process the current GPS locations of wireless communication device 101 to project the expected path for device 101. Navigation computer system 103 would then process the messaging latency and the projected path the estimate the present location of wireless communication device 101. Navigation computer system 103 would then provide the navigation instructions over the voice call based on the estimated present location for wireless communication device 101.

Also note that the user may deviate from the navigation instructions and get off track. Navigation computer system 103 could detect that wireless communication device 101 is off track based on the current GPS locations in the second text messaging. In response, navigation computer system 103 would determine new navigation instructions based on the off-track location and begin to provide the new navigation instructions over the voice call.

Figure 3:
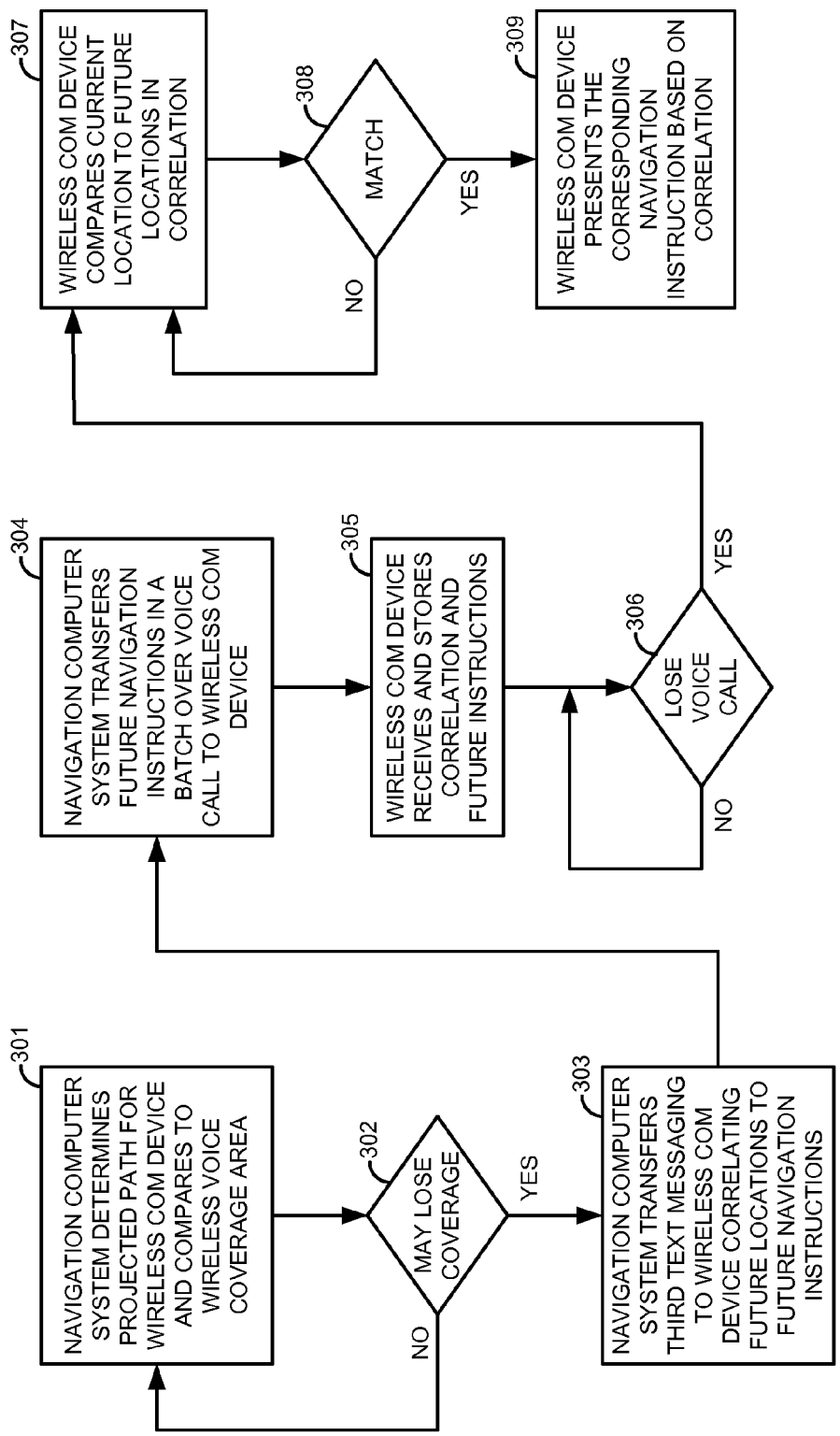
FIG. 3 illustrates an optional operation for the navigation system.

FIG. 3 illustrates an optional operation of navigation system 100. During the voice link navigation session, navigation computer system 103 processes the current GPS locations of wireless communication device 101 to project its expected path (301). Navigation computer system 103 compares the expected path to a coverage map for communication system 102 to determine that wireless communication device 101 will lose wireless voice communication service within a short time (301). For example, navigation computer system 103 might project a path for the user two minutes into the future based on the past and current locations of device 101 and the navigation instructions. Navigation computer system 103 would then the compare the estimated GPS coordinates at the far end of the projected path to the GPS coordinates for the wireless voice service coverage area.

In response to the loss-of-service determination (302), navigation computer system 103 automatically transfers third text messaging to wireless communication device 101 that correlates future GPS locations of wireless communication device 101 to future navigation instructions (303). This correlation could be a table that correlates individual GPS locations or GPS ranges to individual navigation instructions as identified by number or code. In response to the loss-of-service determination, navigation computer system 103 also automatically transfers the audio versions of the future navigation instructions in a batch over the voice call to wireless communication device 101 (304). Navigation computer system 103 separates each of the future navigation instructions by a time period to allow wireless communication device 101 to identify and number each of the future navigation instructions as they are received over the voice call. Typically, navigation computer system 103 will provide also voice instructions to the user about the process to avoid confusion, such as "you are about to lose wireless communication service, so we are transferring a batch of future navigation instructions for your device to play at the appropriate locations." As long as the voice call is available, navigation computer system 103 would continue to provide navigation instructions as described in FIG. 2. Navigation computer system 103 would coordinate the batch transfer of future instructions around these navigation instructions and provide voice messages to the user to avoid confusion. In some examples, text messaging could be used to turn off the speakerphone during the batch transfer and then turn the speakerphone back on for additional navigation instructions.

Wireless communication device 101 receives the third text messaging, and in response, receives and processes the batch of future navigation instructions over the voice call (305). Wireless communication device 101 stores the correlation of future GPS locations to future navigation instructions (305). Wireless communication device 101 also identifies and stores the individual future navigation instructions (305). If the voice call drops (306), wireless communication device 101 begins to compare its current GPS location to the future GPS locations to find a match (307). If a match is found (308), then wireless communication device 101 audibly presents the corresponding navigation instruction from the set of future navigation instructions (309).

Figure 4:
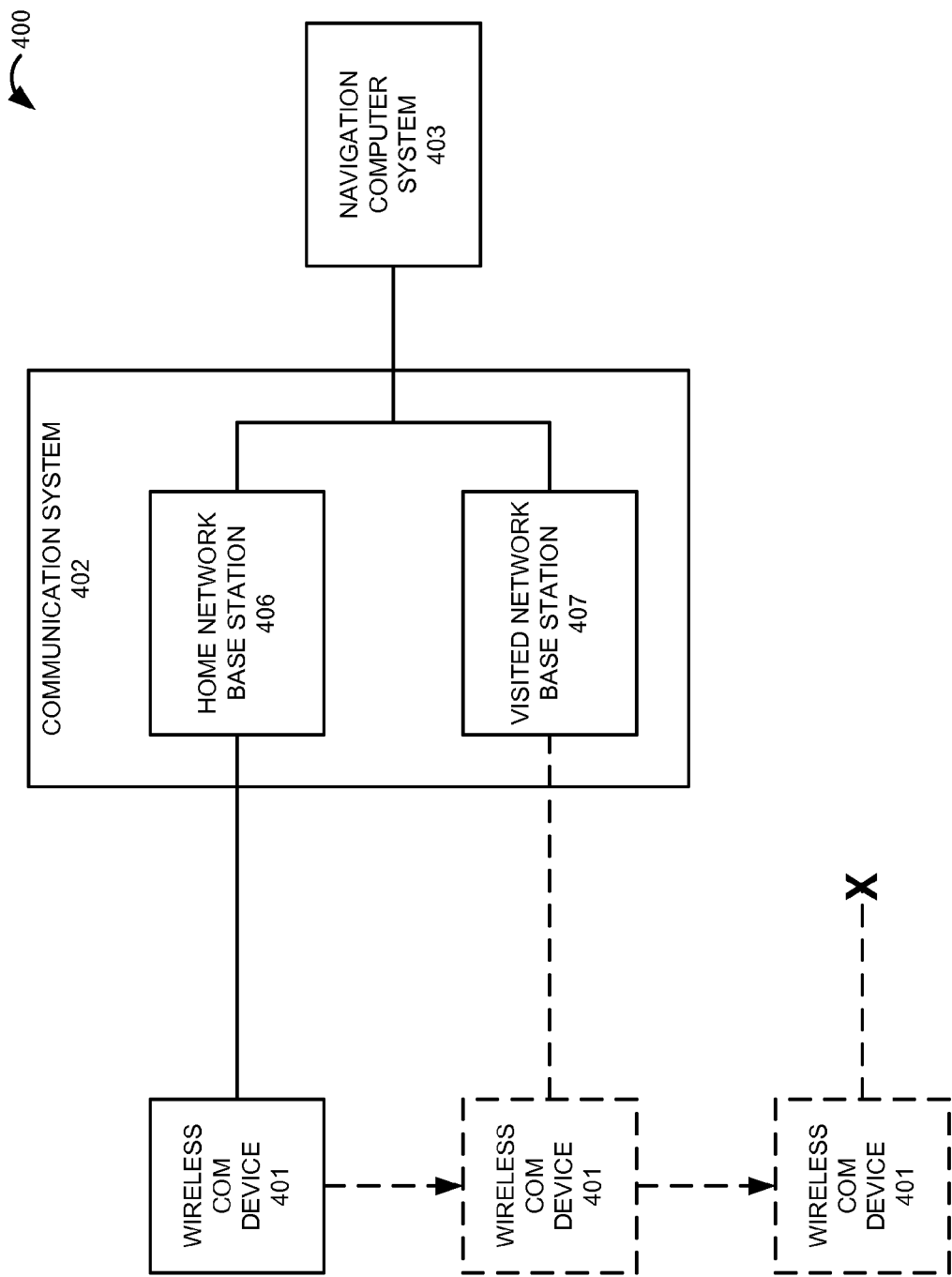
FIG. 4 illustrates a navigation system.

FIG. 4 illustrates navigation system 400. Navigation system 400 comprises wireless communication device 401, communication system 402, and navigation computer system 403. Communication system 402 includes home network base station 406 and visited network base station 407. While in an urban area, wireless communication device 401 and navigation computer system 403 can implement navigation sessions over a wireless data link to home network base station 406. As wireless communication device 401 moves into a rural area, it eventually can no longer receive voice or data communication service from home network base station 406. Once in the rural area, wireless communication device 401 can receive wireless voice service from visited network base station 406, but unfortunately, visited network base station 406 does not provide wireless data service. Thus, wireless communication device 401 and navigation computer system 403 will implement navigation sessions over a wireless voice link to visited network base station 407 as described in FIG. 2. As wireless communication device 401 moves further into the rural area, it eventually can no longer receive voice communication service from visited network base station 407. As this occurs, wireless communication device 401 and navigation computer system 403 implement navigation sessions as described in FIG. 3. In some cases, wireless communication device 401 may start a navigation session over a wireless data link to home network base station 406, transfer the navigation session to a wireless voice link to home network base station 406, transfer the navigation session to a wireless voice link to visited network base station 407, and finish the navigation session without any wireless connectivity.

Figure 5:
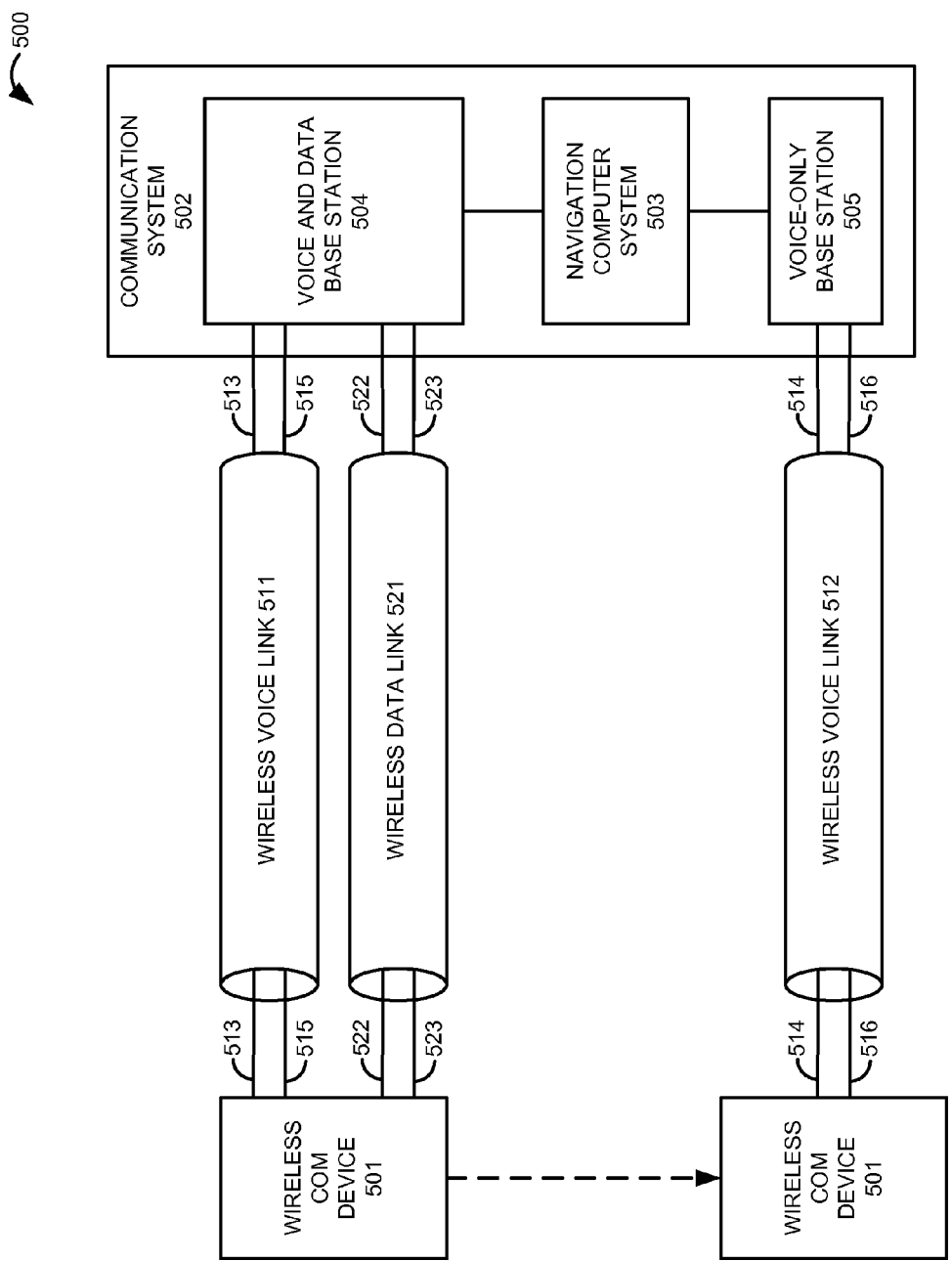
FIG. 5 illustrates a navigation system.

FIG. 5 illustrates navigation system 500. Navigation system 500 comprises wireless communication device 501 and communication system 502. Communication system 502 comprises navigation computer system 503, voice and data base station 504, and voice-only base station 505. Wireless communication device 501 and voice and data base station 504 communicate over wireless voice link 511 and wireless data link 521. Wireless voice link 511 comprises voice bearer channel 513 and voice paging channel 515. Wireless data link 521 comprises data bearer channel 522 and data control channel 523. Wireless voice link 511 could be a wireless 1x voice link, and wireless data link 521 could be a wireless 3G data link.

Wireless communication device 501 and navigation computer system 503 can exchange text messages over voice paging channel 515. Wireless communication device 501 and navigation computer system 503 can exchange audio over voice calls carried by voice bearer channel 513. Thus, wireless communication device 501 and navigation computer system 503 can implement navigation sessions over wireless voice link 511 without using wireless data link 521 as described above for FIGS. 2-3.

Wireless communication device 501 and voice-only base station 505 communicate over wireless voice link 512. Wireless voice link 512 comprises voice bearer channel 514 and voice paging channel 516. Wireless voice link 512 could be a wireless 1x voice link.

Wireless communication device 501 and navigation computer system 503 can exchange text messages over voice paging channel 516. Wireless communication device 501 and navigation computer system 503 can exchange audio over voice calls carried by voice bearer channel 514. Thus, wireless communication device 501 and navigation computer system 503 can implement navigation sessions over wireless voice link 512 without using a wireless data link as described above for FIGS. 2-3.

Figure 6:
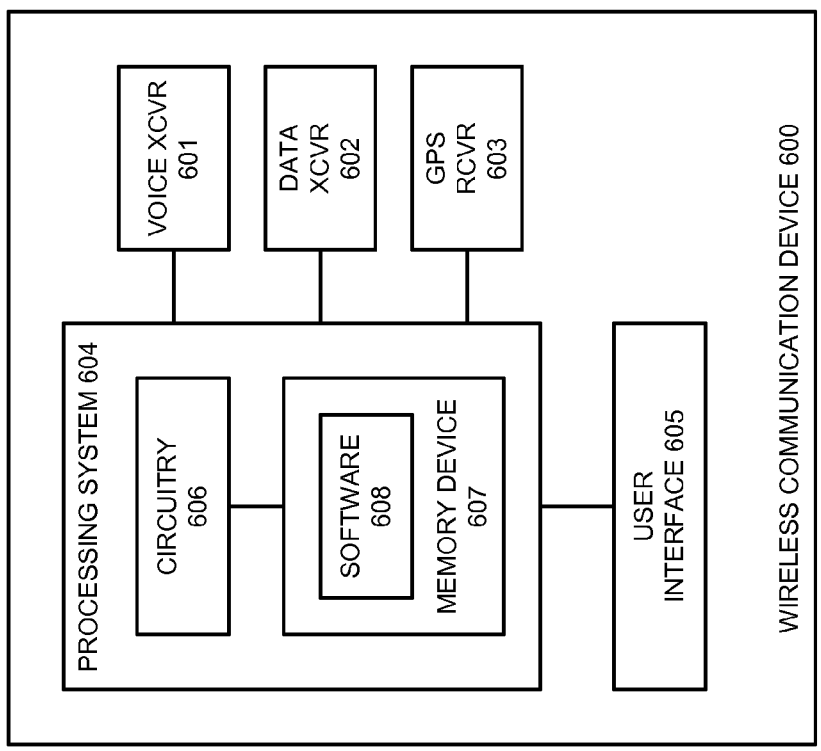
FIG. 6 illustrates a wireless communication device.

FIG. 6 illustrates wireless communication device 600. Wireless communication device 600 is an example of wireless communication devices 101, 401, and 501, although devices 101, 401, and 501 may use alternative configurations. Wireless communication device 600 comprises wireless voice transceiver 601, wireless data transceiver 602, GPS receiver 603, processing system 604, and user interface 605. Processing system 604 comprises processing circuitry 606 and memory device 607 that stores operating software 608. Processing system 604 is linked to wireless transceivers 601-602, GPS receiver 603, and user interface 605. Wireless communication device 600 may include other well-known components that are not shown for clarity, such as a battery, camera, and enclosure.

Wireless transceivers 601-602 comprise an antenna, RF transceiver, signal processing circuitry, software, and/or some other wireless communication components. Wireless transceivers 601-602 may be discrete elements or they may be partially or completely integrated together. Wireless voice transceiver 601 may use various protocols, such as Code Division Multiple Access (CDMA), Global System for Mobile Communication (GSM), or some other wireless voice communication format. Wireless data transceiver 602 may use various protocols, such as Evolution Data Only (EVDO), Worldwide Interoperability for Microwave Access (WIMAX), Long Term Evolution (LTE), or some other wireless data communication format. Wireless voice transceiver 601 exchanges text messages and voice calls to support voice-link navigation sessions as described herein.

GPS receiver 603 comprises an antenna, satellite receiver, signal processing circuitry, software, and/or some other satellite communication components. GPS receiver 603 receives and processes GPS signals from GPS satellites to produce geographic coordinates that specify the current geographic location of wireless communication device 600.

User interface 605 comprises a speaker and other components that interact with a user, such as buttons, lights, display, touch screen, microphone, or some other user input/output apparatus—including combinations thereof. User interface 605 prompts the user for voice-link navigation sessions, receives user selections for the navigation sessions, and audibly presents navigation instructions to the user for the navigation sessions as described herein.

Processing circuitry 606 comprises microprocessor and other circuitry that retrieves and executes operating software 608 from memory device 607. Memory device 607 comprises a computer-readable storage medium, such as a disk drive, flash drive, data storage circuitry, or some other memory apparatus. Memory device 607 may also store correlated GPS location and navigation instruction data as described herein. Processing circuitry 606 is typically mounted on a circuit board that may also hold memory device 607 and portions of user interface 605 and components 601-603.

Operating software 608 comprises computer programs, firmware, or some other form of computer-readable processing instructions. Operating software 608 may include an operating system, utilities, drivers, network interfaces, applications, or some other type of software. When executed by processing circuitry 606, operating software 608 directs processing system 604 to operate wireless communication device 600 as described herein for wireless communication devices 101, 401, and/or 501. In some examples, operating software 608 directs processing system 604 to implement navigation sessions over wireless voice transceiver 601 as described herein.

Figure 7:
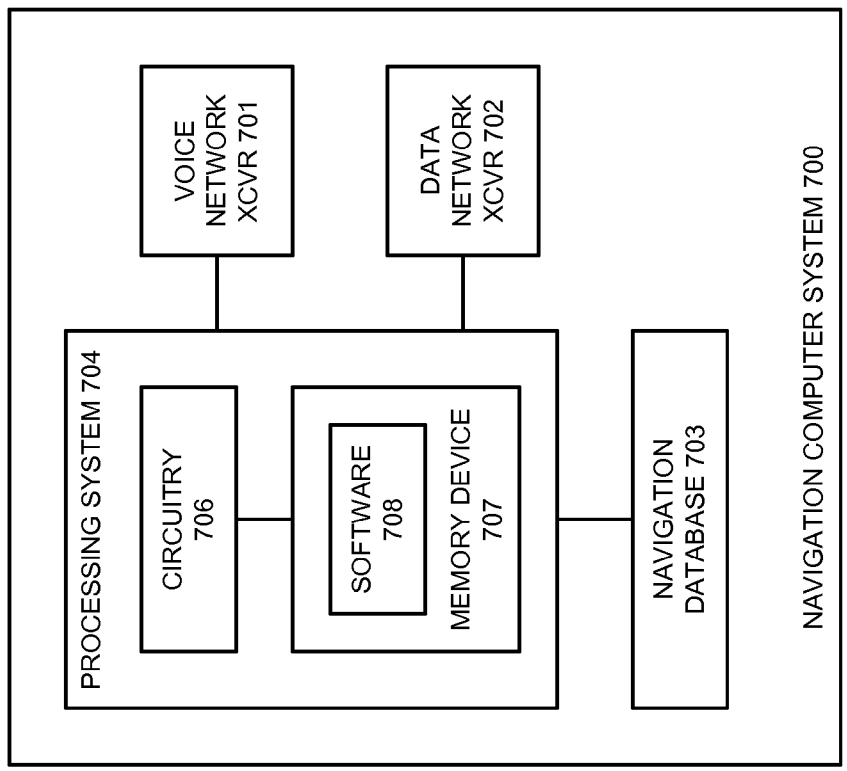
FIG. 7 illustrates a navigation computer system.

FIG. 7 illustrates navigation computer system 700. Navigation computer system 700 is an example of navigation computer systems 103, 403, and 503, although these systems may use alternative configurations. Navigation computer system 700 comprises voice network transceiver 701, data network transceiver 702, navigation database 703, and processing system 704. Processing system 704 comprises processing circuitry 706 and memory device 707 that stores operating software 708. Processing system 704 is linked to transceivers 701-702 and database 703. Navigation computer system 700 may include other well-known components that are not shown for clarity, such as user interfaces, enclosures, and servers.

Voice and data network transceivers 701-702 comprise physical communication ports, signal processing circuitry, software, and/or some other communication components. Voice network transceiver 701 is equipped to initiate and receive voice calls and to exchange text messages. Data network transceiver 701 is equipped to exchange data packets, such as internet protocol messages. Voice network transceiver 701 exchanges text messages, initiates voice calls, and transfers audio to support navigation sessions as described herein. In some examples, data network transceiver 702 may exchange IP messages to support navigation sessions as well.

Navigation database 703 comprises processing circuitry and a computer-readable storage medium that stores software and data. Navigation database 703 receives an initial location data and a destination location data and responds with navigation instructions as described herein. In alternative configurations, navigation database 703 is located externally to navigation computer system 700.

Processing circuitry 706 comprises microprocessor and other circuitry that retrieves and executes operating software 708 from memory device 707. Memory device 707 comprises a computer-readable storage medium, such as a disk drive, flash drive, data storage circuitry, or some other memory apparatus. Processing circuitry 706 is typically mounted on a circuit board that may also hold memory device 707 and portions of components 701-702.

Operating software 708 comprises computer programs, firmware, or some other form of computer-readable processing instructions. Operating software 708 may include an operating system, utilities, drivers, network interfaces, applications, or some other type of software. When executed by processing circuitry 706, operating software 708 directs processing system 704 to operate navigation computer system to provide navigation sessions as described herein. Operating software 708 directs processing system 704 to process text messaging to transfer audio navigation instructions as described herein.

Referring back to FIG. 1, wireless communication device 101 comprises an antenna and RF communication circuitry for wireless communication. The RF communication circuitry typically includes an amplifier, filter, RF modulator, and signal processing circuitry. Wireless communication device 101 also comprises processing circuitry, memory, software, and a user interface. Communication system 102 comprises antennas and RF communication circuitry for wireless communication. The RF communication circuitry typically includes an amplifier, filter, RF modulator, and signal processing circuitry. Communication system 102 also comprises communication equipment and communication links. The equipment may include call processors, routers, servers, switches, memory devices, software, processing circuitry, cabling, power supplies, communication interfaces, and other communication apparatus—including combinations thereof. Communication system 102 may be a discrete network or may be comprised of multiple networks. Wireless link 104 uses the air or space as the transport media. Wireless link 104 may use various protocols, such as Code Division Multiple Access (CDMA), Global System for Mobile Communication (GSM), or some other wireless voice communication format. Communication link 105 uses metal, glass, air, space, or some other material as the transport media. Communication link 105 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 105 could be a direct link or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a navigation system comprising:
   in a navigation computer system, receiving first text messaging transmitted by a wireless communication device for a navigation session over a wireless voice link wherein the first text messaging indicates an identity of the wireless communication device, an initial location of the wireless communication device, and a destination location for the wireless communication device;
   in the navigation computer system, processing the first text messaging to determine navigation instructions from the initial location to the destination location and to initiate a voice call to the wireless communication device;
   in the navigation computer system, receiving second text messaging transmitted by the wireless communication device indicating current locations of the wireless communication device;
   in the navigation computer system, processing the second text messaging to select and transfer audio versions of the navigation instructions over the voice call based on the current locations of the wireless communication device.

2. The method of claim 1 further comprising, in the wireless communication device, determining that the navigation session is not available over a wireless data network, and in response, prompting the user, receiving a user selection, and transmitting the first text messaging for delivery to the navigation computer system.

3. The method of claim 1 further comprising, in the wireless communication device, processing a caller number for the voice call, and in response, automatically answering the voice call in speaker-phone mode.

4. The method of claim 3 further comprising, in the wireless communication device, processing the caller number for the voice call, and in response, automatically transferring the second text messaging for delivery to the navigation computer system.

5. The method of claim 1 further comprising, in the navigation computer system, processing the second text messaging to determine that the wireless communication device will lose wireless voice communication service, and in response, transferring third text messaging for delivery to the wireless communication device, wherein the third text messaging correlates future locations of the wireless communication device to future ones of the navigation instructions.

6. The method of claim 5 further comprising, in the navigation computer system, transferring the future ones of the navigation instructions over the voice call in a batch in response to determining that the wireless communication device will lose the wireless voice communication service.

7. The method of claim 6 further comprising, in the wireless communication device, receiving the third text messaging and the batch of the future navigation instructions, and in response, audibly presenting individual ones of the future navigation instructions based on the current locations of the wireless communication device.

8. The method of claim 7 wherein transferring the future navigation instructions over the voice call in the batch comprises separating the individual ones of the future navigation instructions in the batch by a time period.

9. The method of claim 8 wherein presenting the individual ones of the future navigation instructions comprises identifying the individual ones of the future navigation instructions based on the time period separation and individually correlating the future navigation instructions to the future locations based on the third text messaging.

10. The method of claim 1 wherein the wireless voice link comprises a 1x wireless voice link.

11. A navigation system comprising:
    a wireless communication device configured to determine that navigation is not available over a wireless data network, and in response, prompt the user for a navigation session over a wireless voice link and transmit first text messaging for delivery to a navigation computer system, wherein the first text messaging indicates an identity, an initial location, and a destination location for the wireless communication device;
    the navigation computer system configured to receive and process the first text messaging to determine navigation instructions from the initial location to the destination location and to initiate a voice call to the wireless communication device;
    the wireless communication device configured to process a caller number for the voice call, and in response, automatically answer the voice call in speaker-phone mode and transfer second text messaging for delivery to the navigation computer system, wherein the second text messaging indicates current locations of the wireless communication device;
    the navigation computer system configured to receive and process the second text messaging to select and transfer audio versions of the navigation instructions over the voice call based on the current locations of the wireless communication device;

the wireless communication device configured to receive the audio versions of the navigation instructions over the voice call and audibly present the navigation instructions.

12. The navigation system of claim 11 wherein the navigation computer system is configured to process the second text messaging to determine that the wireless communication device will lose wireless voice communication service, and in response, transfer third text messaging for delivery to the wireless communication device, wherein the third text messaging correlates future locations of the wireless communication device to future ones of the navigation instructions.

13. The navigation system of claim 12 wherein the navigation computer system is configured to transfer the future ones of the navigation instructions over the voice call in a batch in response to determining that the wireless communication device will lose the wireless voice communication service.

14. The navigation system of claim 13 wherein the wireless communication device is configured to receive the third text messaging and the batch of the future navigation instructions, and in response, audibly present individual ones of the future navigation instructions based on the current locations of the wireless communication device.

15. The navigation system of claim 14 wherein the navigation computer system is configured to separate the individual ones of the future navigation instructions in the batch by a time period for the transfer of the future navigation instructions over the voice call.

16. The navigation system of claim 15 wherein the wireless communication device is configured to identify the individual ones of the future navigation instructions based on the time period separation and to individually correlate the future navigation instructions to the future locations based on the third text messaging.

17. The navigation system of claim 11 wherein the navigation instructions comprise turn-by-turn directions.

18. The navigation system of claim 11 wherein the wireless voice link comprises a voice paging channel that carries the text messaging and a voice bearer channel that carries the audio versions of the navigation instructions.

19. The navigation system of claim 11 wherein the wireless communication device comprises a Global Positioning Satellite receiver.

20. The navigation system of claim 11 wherein the wireless voice link comprises a 1x wireless voice link.

* * * * *